(12) United States Patent
Choi

(10) Patent No.: US 6,996,109 B2
(45) Date of Patent: Feb. 7, 2006

(54) ATM CELL TRANSMITTING/RECEIVING DEVICE OF ATM SWITCHING SYSTEM

(75) Inventor: Myung Soon Choi, Suwon (KR)

(73) Assignee: LG Electronics Inc., Seoul (KR)

(*) Notice: Subject to any disclaimer, the term of this patent is extended or adjusted under 35 U.S.C. 154(b) by 689 days.

(21) Appl. No.: 09/745,345

(22) Filed: Dec. 26, 2000

(65) Prior Publication Data

US 2001/0030966 A1    Oct. 18, 2001

(30) Foreign Application Priority Data

Dec. 27, 1999  (KR) .............................. 1999-62613
Oct. 20, 2000  (KR) .............................. 2000-61859

(51) Int. Cl.
   *H04L 12/56* (2006.01)
(52) U.S. Cl. .................... 370/395.6; 370/397; 370/399
(58) Field of Classification Search ............. 370/395.1, 370/399, 395.6, 389, 395.64
   See application file for complete search history.

(56) References Cited

U.S. PATENT DOCUMENTS 5,509,007 A * 4/1996 Takashima et al. ......... 370/391
6,434,154 B1 * 8/2002 Stacey et al. ........... 370/395.64
6,483,838 B1 * 11/2002 Ostman et al. .......... 370/395.31
6,594,267 B1 * 7/2003 Dempo ................... 370/395.64
6,621,821 B1 * 9/2003 Song ....................... 370/395.6

OTHER PUBLICATIONS

Mauger, Roy et al.; "QoS Guarantees for Multimedia Services on a TDMA-Based Satellite Network", Jul. 1997, IEEE Communications Magazine; pp. 56-65.*

* cited by examiner

Primary Examiner—Brian Nguyen
Assistant Examiner—Tri H Phan
(74) Attorney, Agent, or Firm—Fleshner & Kim, LLP

(57) ABSTRACT

An ATM cell transmitting device capable of multiplexing a plurality of time slots with a single ATM cell by using an AAL2, which includes a time slot input unit for switching a plurality of time slots; a packet processing unit for receiving the switched time slot data and forming a CPS packet; a CAM for receiving header information of the CPS packet and outputting the ATM buffer number; an ATM cell transmitting unit for storing the data of the CPS packet according to the ATM buffer number outputted from the CAM, to form ATM cells; and a controlling unit for performing a general controlling operation.

20 Claims, 4 Drawing Sheets

| | | |
|---|---|---|
| CID | Channal Identifier | (8bits) |
| LI | Length Indicator | (6bits) |
| UUI | User-to-User Indication | (5bits) |
| HEC | Header Error Control | (5bits) |
| CPS-INFO | Information | (1..45/64bytes) |

| | | | | | | |
|---|---|---|---|---|---|---|
| VPI | Virtual path identifier | (12 bits) | | OSF | Offset Field | (6 bits) |
| VCI | Virtual channel identifier | (16 bits) | | SN | Sequence Number | (1 bits) |
| PT | Payload type | (3 bits) | | P | Parity | (1 bits) |
| CLP | Cell loss priority | (1 bits) | | | | |
| HEC | Header error control | (8 bits) | | | | |

| CID | LI | UUI | HEC | CPS-INFO |

CID       Channal Identifier        (8bits)
LI        Length Indicator          (6bits)
UUI       User-to-User Indication   (5bits)
HEC       Header Error Control      (5bits)
CPS-INFO  Information               (1..45/64bytes)

ATM CELL TRANSMITTING/RECEIVING DEVICE OF ATM SWITCHING SYSTEM

BACKGROUND OF THE INVENTION

1. Field of the Invention

The present invention relates to an ATM (asynchronous transfer mode) switching system, and more particularly, to an ATM cell transmitting/receiving device using an AAL2 (ATM adaptation layer 2).

2. Description of the Background Art

FIG. 1 is a schematic block diagram of an ATM cell transmitting device using an AAL1 in accordance with a conventional art.

With reference to FIG. 1, a time switch 1 serves to switch a 64 Kbps time slot. An SAR (segmentation and reassembly) controller 2 ressembles a plurality of time slots to form an ATM cell or segments the ATM cell to a plurality of time slots by using an AAL1 protocol, so as to form an ATM cell.

A buffer 3 serves to disconnect CPU of the SAR controller 2 and that of a controlling unit 5 when they concurrently accesses an SRAM 4. The SRAM 4 stores a time slot data provided from the SAR controller 2 and a control data of the controlling unit 5.

A control logic 7 generates a signal to access the first buffer unit 6, a second buffer unit 9 and a CAM 8, and the CAM (Content Addressable Memory) 8 stores a VPI (Virtual Path Identifier)/VCI (Virtual Channel Identifier) which corresponds to the time slot number in a look-up table form.

The controlling unit 5 writes a control data of the SAR controller 2 in the SRAM 4 and inserts and clears input/output data of the CAM 8 when a call is connected and released.

The first buffer unit 6 temporarily stores an ATM cell outputted from the SAR controller 2 and the control logic 7, and the second buffer unit 9 temporarily stores an ATM cell to be transmitted to an ATM network (not shown) or an ATM cell received from the ATM network.

The operation of the ATM cell transmitting/receiving device in accordance with the conventional art constructed as described above will now be explained with reference to the accompanying drawings.

1) ATM Cell Transmitting Operation

When a call is connected, time slot data switched by the time switch 1 are sequentially stored in the SRAM 4 through the SAR controller 2 and the buffer 3.

Once 256 time slot data are stored in the SRAM 4, the SAR controller 2 reads again the time slot data stored in the SRAM 4 to form an ATM cell. That is, the SAR controller 2 assembles the time slot data to an ATM cell by using a AAL1 protocol, attaches a time slot number to a header of the assembled ATM cell, and outputs it to the first buffer unit 6. Accordingly, 53-byte ATM cells are sequentially stored in the first buffer unit 6.

The control logic 7 reads the time slot number of the ATM cell header from the first buffer unit 6 and outputs it to the CAM 8.

The CAM 8 outputs the VPI/VCI corresponding to the input time slot number to the control logic 7 on the basis of the VPI/VCI information and the time slot number provided from the controlling unit 5 when a call is connected.

Accordingly, the control logic 7 substitutes the time slot number with the VPI/VCI read from the CAM 8, reads a payload of the ATM cell from the first buffer unit 6 and stores it in the second buffer unit 9.

Thereafter, at the time when the 53 byte ATM cell is wholly stored, the second buffer unit 9 transmits the completed ATM cell to the ATM network.

2) ATM Cell Receiving Operation

The ATM cell transmitted through the ATM network is stored in the second buffer unit 9. When the 53-byte ATM cell is stored, the control logic 7 reads the VPI/VCI of the ATM cell header from the second buffer unit 9 and outputs it to the CAM 8, and receives a time slot number matching with the corresponding VPI/VCI from the CAM 8.

Accordingly, the control logic 7 substitutes the VPI/VCI with the time slot number read from the CAM 17, reads the payload of the ATM cell from the second buffer unit 9 and stores it in the first buffer unit 6.

When the ATM cell is stored in the first buffer unit 6, the SAR controller 2 segments the ATM cell payload to a time slot data by using the AAL1 protocol and stores it in the SRAM 4 through the buffer 3.

Thereafter, when 256 time slot data are all stored in the SRAM 4, the SAR controller 2 reads the 256 time slot data from the SRAM 4 and outputs them to the time switch 1.

In this manner, the conventional ATM cell transmitting/receiving device converts the time slot data to the ATM cell or the ATM cell to the time slot data by using the AAL1 protocol.

However, since the AAL1 allocates only one time slot to one VPI/VCI, and especially, in case of an idle data, it occupies a channel, so that bandwidth efficiency of the ATM network is degraded.

SUMMARY OF THE INVENTION

Therefore, an object of the present invention is to provide an ATM cell transmitting device of an ATM switching system which is capable of multiplexing a plurality of time slots in a single VPI/VCI by using an AAL2 protocol, thereby improving a bandwidth efficiency of an ATM network.

Another object of the present invention is to provide an ATM cell transmitting device of an ATM switching system which is capable of preventing a transmission delay of an ATM cell.

Still another object of the present invention is to provide an ATM cell receiving device of an ATM switching system which is capable of demultiplexing a CPS (Common Part Sublayer) packet having different CIDs in a single ATM cell, to a plurality of time slots Yet another object of the present invention is to provide an ATM cell transmitting device of an ATM switching system which is capable of converting a plurality of ATM cells having a random VPI/VCI to a time slot, thereby improving a bandwidth efficiency of an ATM network.

To achieve these and other advantages and in accordance with the purpose of the present invention, as embodied and broadly described herein, there is provided an ATM cell transmitting device of an ATM switching system including: a time slot input unit for switching a plurality of time slots; a packet processing unit for receiving the switched time slot data and forming a CPS packet; a CAM for receiving header information of the CPS packet and outputting the ATM buffer number; an ATM cell transmitting unit for storing the data of the CPS packet according to the ATM buffer number outputted from the CAM, to form ATM cells; and a controlling unit for performing a general controlling operation.

To achieve the above objects, there is also provided an ATM cell transmitting device of a switching system including: an ATM cell receiving unit for extracting a CPS packet from a received ATM cell and storing it according to an ATM buffer number; a packet processing unit for converting header information of the extracted CPS packet and the ATM buffer number outputted from the ATM cell receiving unit into a time slot number and storing a payload of the CPS packet according to the converted time slot number; and a time slot output unit for demultiplexing the payload of the CPS packet outputted from the packet processing unit to a plurality of time slots and outputting the same.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
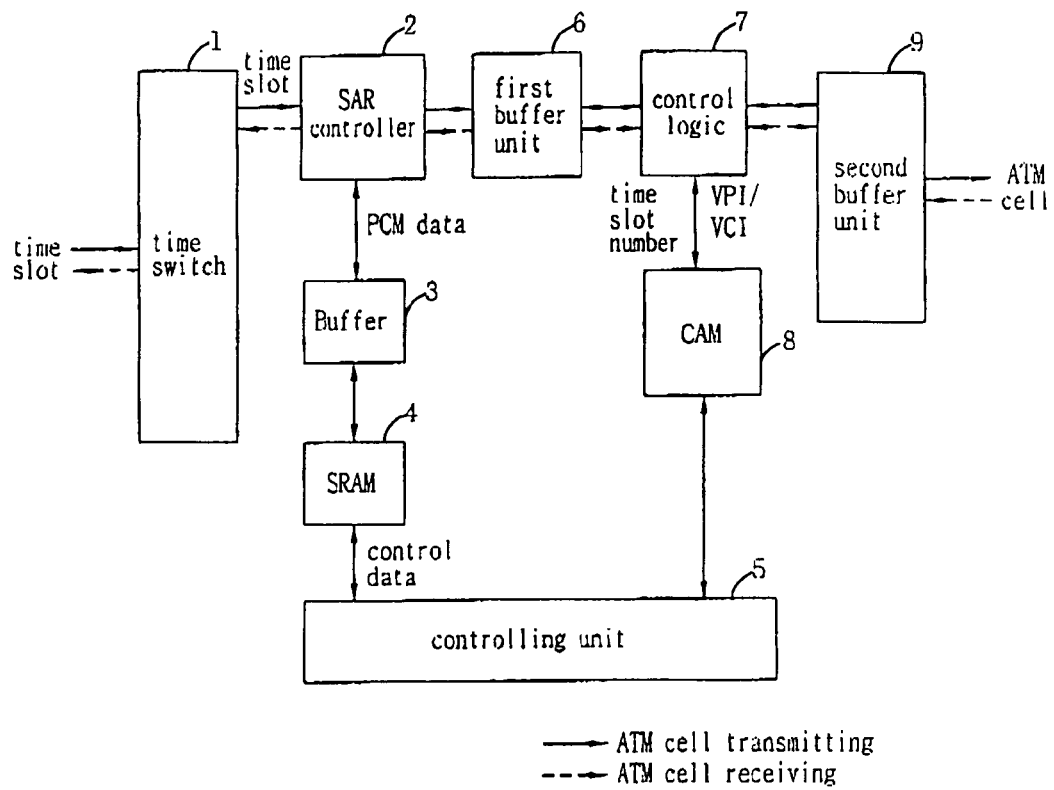
FIG. 1 is a schematic block diagram of an ATM cell transmitting/receiving device of an ATM switching system using an AAL1 in accordance with a conventional art.
Figure 2:
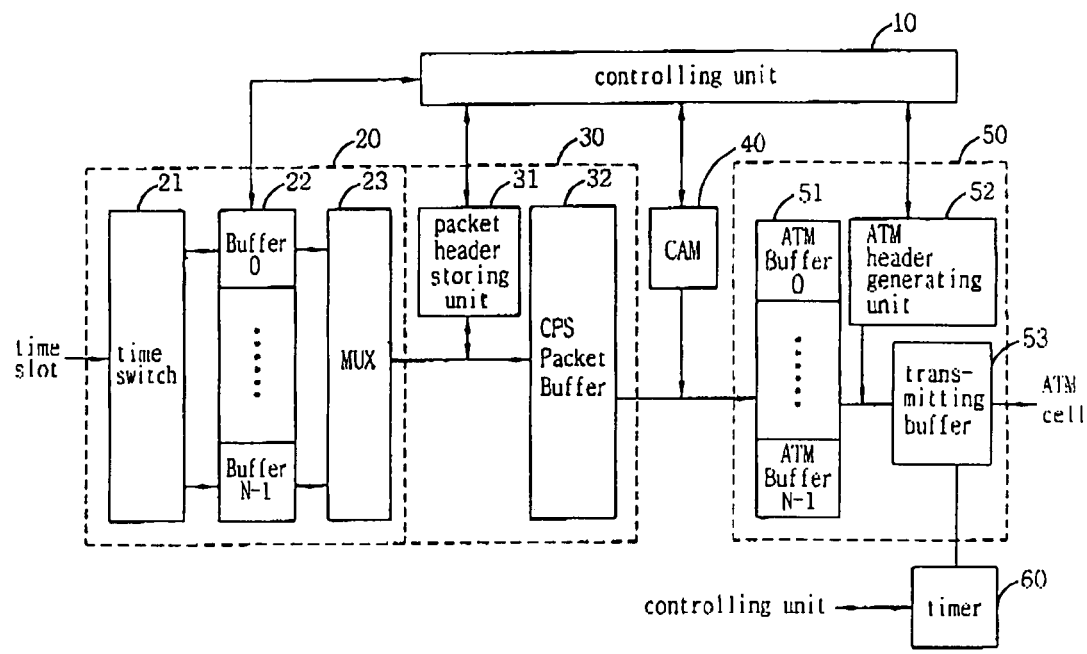
FIG. 2 is a schematic block diagram of an ATM cell transmitting device of an ATM switching system using an AAL2 in accordance with the present invention.

FIG. 2 is a schematic block diagram of an ATM cell transmitting device of an ATM switching system using an AAL2 in accordance with the present invention.

As shown in the drawing, an ATM cell transmitting device in accordance with the present invention includes a controlling unit 10; a time slot input unit 20 for switching and multiplexing a plurality of time slots; a packet processing unit 30 for attaching a packet header to the time slot data multiplexed by the time slot input unit 20, to form a CPS packet; a CAM 40; an ATM cell transmitting unit 50 for combining an output of the packet processing unit 30 and an output of the CAM 40 with an ATM header, to form an ATM cell, and a timer 60 for setting a transmission time of the ATM cell stored in the ATM cell transmitting unit 50.

The controlling unit 10 outputs a control data when a call is connected and released.

The time slot input unit 20 includes a time switch 21 for switching a 64 Kbps time slot, an input buffer unit 22 having N number of small capacity of buffers (buffer 0~buffer N) for storing N number of time slot data outputted from the time switch 20; and a multiplexer (MUX) 23 for searching the N number of small capacity of buffers (buffer 0~buffer N) and selectively outputting a time slot data stored in an effective buffer.

The packet processing unit 30 includes a packet header storing unit 31 for storing a 3-byte CPS packet header by time slot, and a CPS packet buffer 32 for storing the CPS packet header outputted from the packet header storing unit 31 and the output data of the MUX 23, to form a CPS packet.

The CAM 40 stores the ATM buffer number corresponding to the time slot number/CID in a look-up table form.

The ATM cell transmitting unit 50 includes an ATM buffer unit 51 having ATM buffers (ATM buffer 0~ATM buffer N), for storing the CPS packet outputted from the packet processing unit 30 according to the ATM buffer number outputted form the CAM 40, an ATM header generating unit 52 for storing 5-byte ATM header, and a transmitting buffer 53 for combining the output of the ATM buffer unit 51 and the output of the ATM header generating unit 52, to form a 53-byte ATM cell.

The operation of the ATM cell transmitting device of an ATM switching system in accordance with the present invention constructed as described above will now be explained with the accompanying drawings.

In initializing, the controlling unit 10 puts the first byte of every buffer of the input buffer unit 22 in an invalid state.

When a call is connected, 1024 time slot data switched by the time switch 21 are stored in buffers (buffer 0~buffer 1023) by numbers, and thereby the controlling unit 10 puts the first byte of the effective buffers storing the time slot data in a valid state.

And, the controlling unit 10 writes the CPS-packet header in the packet header storing unit 31 into an input time slot unit and writes the ATM buffer number corresponding to the time slot number/CID into the CAM 40. Besides, the controlling unit 10 writes a VPI/VCI matching the ATM buffer number of the CAM 40 into the ATM header generating unit 52, and sets a time-out time of the timer 60.

The multiplexer (MUX) 23 scans periodically the state of buffers (buffer 0~buffer 1023) to check whether the first byte of each buffer is valid. In case that the first byte is valid, the multiplexer 23 outputs a CPS packet header corresponding to the effective buffer number from the packet header storing unit 31 to the CPS packet buffer 32.

Figure 3:
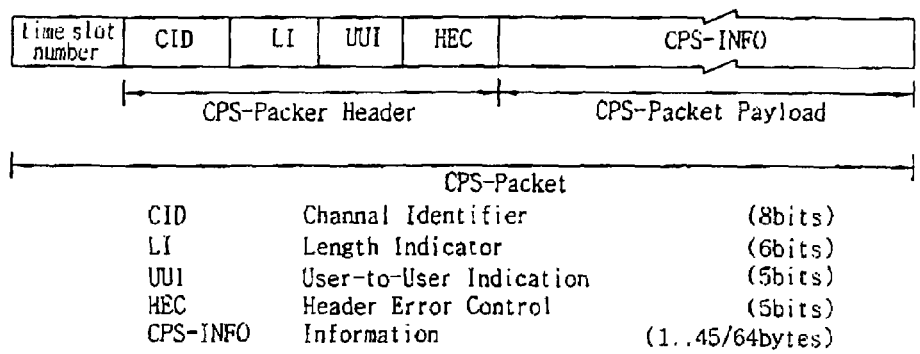
FIG. 3 is a view showing a structure of an AAL2 CPS packet of FIG. 2 in accordance with the present invention.

Accordingly, the CPS packet buffer 32 sequentially stores the outputs of the packet header storing unit 31 and of the multiplexer 23 and forms a CPS packet as shown in FIG. 3.

The CPS packet header includes a time slot field, a channel identifier (CID) field for identifying a plurality of users in a single virtual channel (VC), a length identifier (LI) field for representing the size of an effective load of a CPS packet, a user-to-user indication field for discriminating a CPS user and a network manager, and a header error control (HEC) field for correcting an error of a CPS packet header.

In addition, a CPS-INFO forming a CPS packet payload is the time slot data outputted from the multiplexer 23, the length of which is allocated by the controlling unit 10.

The CPS packet buffer 32 reads the time slot number of the first and the second bytes of each CPS packet and the CID of the third byte, and outputs them to the CAM 40. Then, the CAM 40 outputs an ATM buffer number corresponding to the inputted time slot number and the CID. Consequently, the CPS packet data outputted from the CPS packet buffer 32 is stored in the ATM buffer unit 51 according to the ATM buffer number outputted from the CAM 40. Accordingly, by implementing a look-up table of the CAM 40 in a manner that different time slot numbers and CIDs are allocated for the same ATM buffer numbers, a plurality of time slots can be multiplexed with a single ATM buffer.

Figure 4:
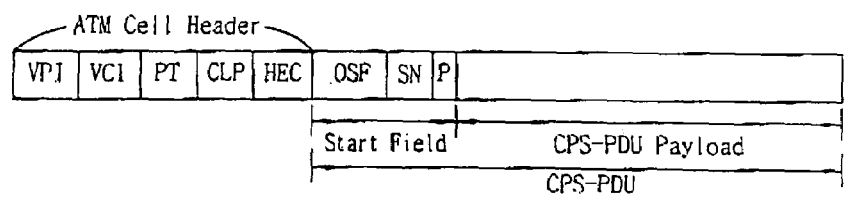
FIG. 4 is a view showing a structure of an ATM layer cell of FIG. 2 in accordance with the present invention.

The transmitting buffer 53 receives 48 byte data from the ATM buffer unit 51 and 5 byte ATM header from the ATM header generating unit 52, and outputs 53 byte ATM cell as completed as shown in FIG. 4 to the ATM network. At this time, the ATM cell consists of 5 byte ATM header and 48 byte CPS-PDU (protocol data unit), and the CPS-PDU payload signifies the CPS packet as shown in FIG. 3.

Accordingly, in the present invention, a plurality of time slots are multiplexed with a single ATM buffer and the output of the multiplexed ATM buffer is combined with the ATM header, resulting in that a plurality of time slots can be multiplexed in a single VPI/VCI.

The time period taken for outputting of the ATM cell from the transmitting buffer 53 is determined by the timer 60. That is, the transmitting buffer 53 is triggered by a time-out signal outputted from the timer 60. Thus, unless the 48 byte data is wholly received from the ATM buffer unit 50 for a predetermined time, the transmitting buffer 53 sets the data that are yet to be received as '0' and completes 53 byte ATM cell. Therefore, in the present invention, it is not necessary to wait until 53 byte data is wholly received as in the conventional art so that transmission delay of the ATM cell is prevented.

Figure 5:
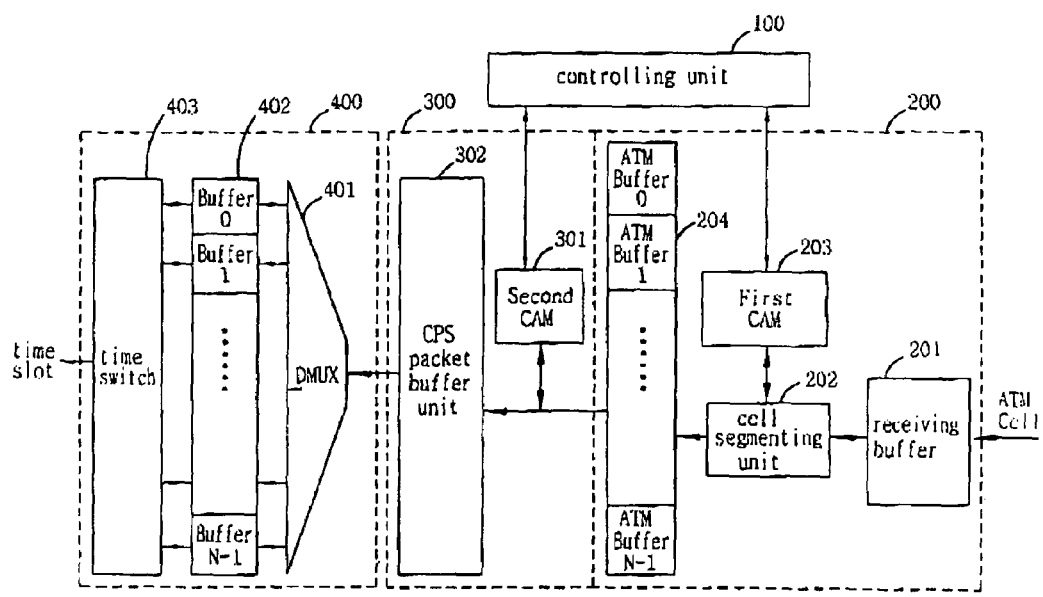
FIG. 5 is a schematic block diagram of an ATM cell receiving device of the ATM switching system using an AAL2 in accordance with the present invention.

FIG. 5 is a schematic block diagram of an ATM cell receiving device of the ATM switching system using an AAL2 in accordance with the present invention.

As shown in the drawing, an ATM cell receiving device of an ATM switching system of the present invention includes a controlling unit 100 for outputting a control data when a call is connected and released; an ATM cell receiving unit 200 for extracting a CPS (Common Part Sublayer) from the received ATM cell; a packet, processing unit 300 for converting header information of the CPS packet extracted from the ATM cell receiving unit 200 into a time slot number and storing a payload of the CPS packet according to the converted time slot number; and a time slot output unit 400 for demultiplexing the CPS packet payload outputted from the packet processing unit 300 to a plurality of time slots and outputting them.

The ATM cell receiving unit 200 includes a receiving buffer 201 for storing an ATM cell received through the ATM network, a cell segmenting unit 202 for segmenting VPI/VCI information and the CPS packet from the ATM cell stored in the receiving buffer 201, a first CAM 203 for outputting an ATM buffer number (ATM ID) corresponding to the input VPI/VCI outputted from the cell segmenting unit 202, and an ATM buffer unit 204 having a small capacity of ATM buffer (ATM buffer 0~ATM buffer N), for storing the CPS packet outputted from the cell segmenting unit 202 according to the ATM ID.

The packet processing unit 300 includes a second CAM 301 for outputting a time slot number upon receipt of the ATM ID from the ATM buffer unit 204, and a CPS packet buffer unit 302 for storing a CPS packet payload outputted from the ATM buffer unit 204 according to the time slot number outputted from the second CAM 301.

The time slot output unit 400 includes a demultiplexer (DEMUX) 401 for receiving the CPS packet payload from the CPS packet buffer unit 302 and demultiplexing it to a plurality of time slots; an output buffer unit 402 having 'N' number of small capacity of buffers (buffer 0~buffer N−1), for storing the time slot data outputted from the demultiplexer; and a time switch 403 for switching the plurality of time slots stored in the output buffer unit 402 at 64 Kbps.

The operation of the ATM cell receiving device of an ATM switching system constructed as described above will now be explained with reference to the accompanying drawings.

The present invention has a structure to be advantageously used to convert one ATM cell as received to a plurality of 64 Kbps time slots by using an AAL2 protocol.

Generally, in case of the AAL2 protocol, a transmitted ATM cell has a random VPI/VCI, and typically, a plurality of time slots are multiplexed in one VPI/VCI.

First, the receiving buffer 201 stores an ATM cell transmitted through the ATM network. The received one ATM cell includes 5 byte ATM cell header and a 48 byte CPS-PDU (Protocol Data Unit). The CPS-PDU includes a start field and a CPS-PDU payload. The start field includes an offset field (OSP), a sequence number (SN) and a parity (P).

When the 53 byte ATM cell is wholly stored in the receiving buffer 201, the cell segmenting unit 202 reads the ATM cell, extracts the VPI/VCI of the ATM cell header and the CPS-PDU payload, and outputs the VPI/VCI to the first CAM 203.

The first CAM 203 stores the VPI/VCI and the ATM buffer number (ATM ID) outputted from the controlling unit 100 in a look-up table when a call is connected. When the VPI/VCI is inputted, the first CAM 203 outputs an ATM ID matching with the input VPI/VCI to the cell segmenting unit 202.

Then, the cell segmenting unit 202 stores a CPS-PDU payload (CPS packet) in the ATM buffer unit 204 according to the inputted ATM buffer number (ATM ID). At this time, the cell segmenting unit 202 checks an HEC (Header Error Correction) field of the CPS packet header and stores only normal CPS packets in the ATM buffer unit 204.

Figure 6:
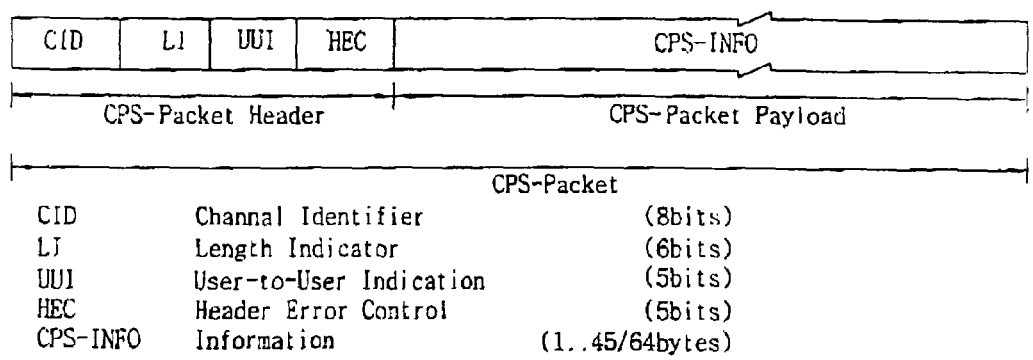
FIG. 6 is a view showing a structure of an AAL2 CPS packet of FIG. 5 in accordance with the present invention.

Accordingly, the CPS-PDU payload becomes the CPS packet as shown in FIG. 6.

Namely, as shown in FIG. 6, the CPS-PDU payload, that is, the CPS packet, includes a CPS-packet header and a CPS packet payload. The CPS-packet header includes a CID field, an LI field, a UUI field and an HEC field.

Accordingly, since the CID field is 8 bit, one virtual channel is able to hold 256 CIDs. Especially, a CPS packet having 256 CIDs can exist in one ATM cell.

When the CPS packet is wholly completed, the ATM buffer 204 reads the CID from the CPS packet and outputs the CID together with the ATM ID to the second CAM 301.

The first CAM 203 stores the ATM ID/CID and the time slot number provided from the controlling unit 100 in a look-up table form when a call is connected. When the ATM ID/CID is inputted from the ATM buffer unit 204, the second CAM 301 outputs a time slot number matching with the input ATM ID/CID to the CPS packet buffer unit 302, and the ATM buffer unit 204 stores the CPS packet payload in the CPS packet buffer unit 302 according to the time slot number outputted from the second CAM 301.

Accordingly, when there are effective CPS packet payload in the CPS packet buffer unit 302, the demultiplexer 401 sequentially stores the CPS packet payloads in the buffers (buffer 0~buffer 1023) of the output buffer unit 402 according to the corresponding time slot number, and the stored 1024 time slot data are outputted through the time switch 403.

In the above descriptions of the present invention, though 1024 number of time slots are taken as an example, various capacity of time slots can be accommodated according to a system specification.

As so far described, according to the ATM cell transmitting device of the present invention, a plurality of time slots can be multiplexed in a single ATM cell. Especially, by multiplexing the plurality of time slots in a single random VPI/VCI. bandwidth efficiency of the ATM network can be heightened.

In addition, in case that the 53 byte ATM cell are not wholly received for a predetermined time, the ATM cell is formed only with the received data to be outputted, so that transmission delay of the ATM CELL can be prevented.

Meanwhile, according to the ATM cell receiving device of the present invention, the bandwidth efficiency can be heightened by holding the plurality of channel (time slot) data in a single ATM cell by using the AAL2 protocol.

In addition, according to the ATM cell receiving device of the present invention, a plurality of ATM cell having a random VPI/VCI can be converted into time slots, so that a CPS packet having different channel identifiers (CIDs) can be easily demultiplexed to a plurality of time slots.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. An ATM (Asynchronous Transfer Mode) cell transmitting device of an ATM switching system comprising:
   a time slot input unit for switching a plurality of time slots;
   a packet processing unit for forming a CPS (Common Part Sublayer) packet using data corresponding to the switched time slots;
   a CAM (Contents Addressable Memory) for receiving header information of the CPS packet and outputting an ATM buffer number;
   an ATM cell transmitting unit for storing the data of the CPS packet outputted from the packet processing unit according to the ATM buffer number outputted from the CAM, to form an ATM cell; and
   a controlling unit for performing a general controlling operation,
   wherein the CAM allocates a same ATM buffer number to include different time slots and CIDs (Channel Identifiers) for identifying a plurality of users in a single VC (Virtual Channel) in the same ATM buffer number.

2. The device according to claim 1, further comprising a timer for setting an ATM cell transmitting time of the ATM cell transmitting unit.

3. The device according to claim 2, wherein the ATM cell transmitting unit receives a CPS packet data and an ATM header for a predetermined time as set in the timer and outputs an ATM cell.

4. The device according to claim 3, wherein the ATM cell transmitting unit sets CPS packet data which is not received yet as '0' and completes an ATM cell, in case that CPS packet data is not wholly received for a predetermined time as set in the timer.

5. The device according to claim 1, wherein the header information of the CPS packet refers to a time slot number and a channel identifier (CID).

6. The device according to claim 1, wherein the time slot input unit comprises:
   a time switch for switching the plurality of time slots;
   an input buffer unit for storing the data corresponding to the plurality of time slots outputted from the time switch; and
   a multiplexer for selectively outputting the data stored in the input buffer unit.

7. The device according to claim 1, wherein the packet processing unit comprises:
   a packet header storing unit for receiving a CPS packet header by time slot from the controlling unit and storing the same; and
   a CPS packet buffer for storing the CPS packet header outputted from the packet header storing unit and the time slot data outputted from the multiplexer, to form a CPS packet.

8. The device according to claim 1, wherein the ATM cell transmitting unit comprises:
   an ATM buffer unit for storing the CPS packet data outputted from the packet processing unit in a plurality of ATM buffers according to the ATM buffer number of the CAM;
   an ATM header generating unit for storing an ATM header; and
   a transmitting buffer for combining the outputs of the ATM buffer unit and of the ATM header generating unit, to form an ATM cell.

9. An ATM (Asynchronous Transfer Mode) cell transmitting device comprising:
   a time slot input unit for switching a plurality of time slots;
   a packet processing unit for receiving data corresponding to the switched time slots and forming a CPS (Common Part Sublayer) packet;
   a CAM (Contents Addressable Memory) for outputting ATM buffer numbers for the time slots and a CID (Channel Identifier) inputted from the packet processing unit;
   an ATM transmitting unit for storing the data of the CPS packet outputted from the packet processing unit according to the ATM buffer number outputted from the CAM, to form an ATM cell;
   a timer for setting an ATM cell transmitting unit; and
   a controlling unit for performing a general controlling operation,
   wherein the CAM includes a look-up table having different time slot numbers and CIDs (Channel Identifiers) for identifying a plurality of users in a single VC (Virtual Channel) allocated to a same ATM buffer number such that a plurality of time slots are multiplexed in the same ATM buffer number.

10. The device according to claim 9, wherein the time slot input unit comprises:
    a time switch for switching the plurality of time slots;
    an input buffer unit having a plurality of small capacity of buffers, for storing the data corresponding to the plurality of time slots outputted from the time switch; and
    a multiplexer for selectively outputting data stored in the input buffer unit.

11. The device according to claim 9, wherein the packet processing unit comprises:
    a packet header storing unit for storing a CPS packet header provided from the controlling unit; and
    a CPS packet buffer for storing the CPS packet header outputted from the packet header storing unit and the time slot data outputted from the multiplexer to form a CPS packet.

12. The device according to claim 9, wherein the ATM cell transmitting unit sets CPS packet data which is not received yet as '0' and completes an ATM cell, in case that CPS packet data is not wholly received for a predetermined time as set in the timer.

13. The device according to claim 9, wherein the ATM cell transmitting unit comprises:
- an ATM buffer unit for storing the CPS packet data outputted from the packet processing unit in a plurality of ATM buffers indicated by the ATM buffer number of the CAM;
- an ATM header generating unit for storing the ATM header provided from the controlling unit; and
- a transmitting buffer for combining the outputs of the ATM buffer unit and of the ATM header generating unit, to form an ATM cell.

14. An ATM cell transmitting device of a switching system comprising:
- an ATM cell receiving unit for extracting a CPS (Common Part Sublayer) packet from a received ATM cell and storing it according to an ATM buffer number;
- a packet processing unit for converting header information of the extracted CPS packet and the ATM buffer number outputted from the ATM cell receiving unit into a time slot number and storing a payload of the CPS packet according to the time slot number; and
- a time slot output unit for demultiplexing the payload of the CPS packet outputted from the packet processing unit to a plurality of time slots and outputting the same, wherein a single ATM buffer number includes multiple time slot numbers and CIDs (Channel Identifiers) for identifying a plurality of users in a single VC (Virtual Channel).

15. The device according to claim 14, wherein the header information of the CPS packet includes the CID.

16. The device according to claim 14, wherein the ATM buffer number is determined by the VPI/VCI included in the header of the ATM cell.

17. The device according to claim 14, wherein the ATM cell receiving unit comprises:
- a receiving buffer for storing the ATM cell received through the ATM network;
- a cell segmenting unit for reading the ATM cell from the receiving buffer, extracting a CPS packet and outputting VPI/VCI information of the ATM cell header;
- a first CAM for outputting an ATM buffer number corresponding to the output VPI/VCI of the cell segmenting unit; and
- an ATM buffer unit for storing the CPS packet outputted from the cell segmenting unit according to the ATM buffer number outputted from the first CAM.

18. The device according to claim 17, wherein the ATM buffer unit has a small capacity of N number of ATM buffers, for outputting an ATM buffer number and the CID of the CPS packet header to the packet processing unit as the CPS packet is wholly completed.

19. The device according to claim 17, wherein the packet processing unit comprises:
- a second CAM for outputting a time slot number corresponding to the ATM buffer number inputted from the ATM receiving unit; and
- a CPS packet buffer unit for storing the CPS packet payload outputted from the ATM receiving unit according to the time slot number outputted from the second CAM.

20. The device according to claim 14, wherein the time slot output unit comprises:
- a demultiplexer for receiving the CPS packet payload from the CPS packet buffer unit and demultiplexing it to a plurality of time slots;
- an output buffer unit having N number of small capacity of buffers, for storing data corresponding to the time slots demultiplexed by the demultiplexer; and
- a time switch for switching the plurality of time slots stored in the output buffer unit.

\* \* \* \* \*